United States Patent [19]

Shuart

[11] Patent Number: 5,352,146
[45] Date of Patent: Oct. 4, 1994

[54] COMBINED TRIGGER BOW RELEASE AND TURKEY CALL

[76] Inventor: Keith W. Shuart, R.D. 1, Box 96, Unadilla, N.Y. 13849

[21] Appl. No.: 139,764

[22] Filed: Oct. 22, 1993

[51] Int. Cl.⁵ ............................................. A63H 5/00
[52] U.S. Cl. .................................... 446/397; 446/81; 446/404; 124/35.1
[58] Field of Search .................. 446/71, 81, 397, 404; 124/31, 35.1, 35.2; 472/64

[56] References Cited

U.S. PATENT DOCUMENTS

| | | | |
|---|---|---|---|
| 1,449,756 | 3/1923 | Jackson | 446/397 |
| 2,000,015 | 5/1935 | Flury | 124/35.1 |
| 2,488,597 | 11/1949 | Konold | 124/35.2 |
| 2,606,401 | 8/1952 | Boatwright | 446/397 |
| 2,958,157 | 11/1960 | Tannehill | 446/397 |
| 3,898,974 | 8/1975 | Keck | 124/35.2 |
| 3,998,202 | 12/1976 | Boyko | 124/35.2 |
| 4,003,159 | 1/1977 | Piper | 446/397 |
| 4,041,639 | 8/1977 | Funk | 446/397 |
| 4,282,851 | 8/1981 | Lyons | 124/35.2 |
| 4,603,676 | 8/1986 | Luoma | 124/35.1 |

Primary Examiner—Robert A. Hafer
Assistant Examiner—Jeffrey D. Carlson
Attorney, Agent, or Firm—E. Michael Combs

[57] ABSTRACT

A turkey call device is arranged in cooperation with a bow string release to permit an individual to maintain control of an associated bow string while effecting actuation of a turkey call. An arrow release mechanism includes a resilient rod head arranged to receive a bow string, such that the bow string is received within an associated barrel tube, wherein subsequent actuation of a trigger projects the resilient rod head from the tube permitting subsequent release of the associated bow string. Further, the sounding mechanism is directed to a reciprocating rod arranged to project and effect cooperation of a striker plate, with a projecting leg to provide for a turkey call audible signal.

4 Claims, 4 Drawing Sheets

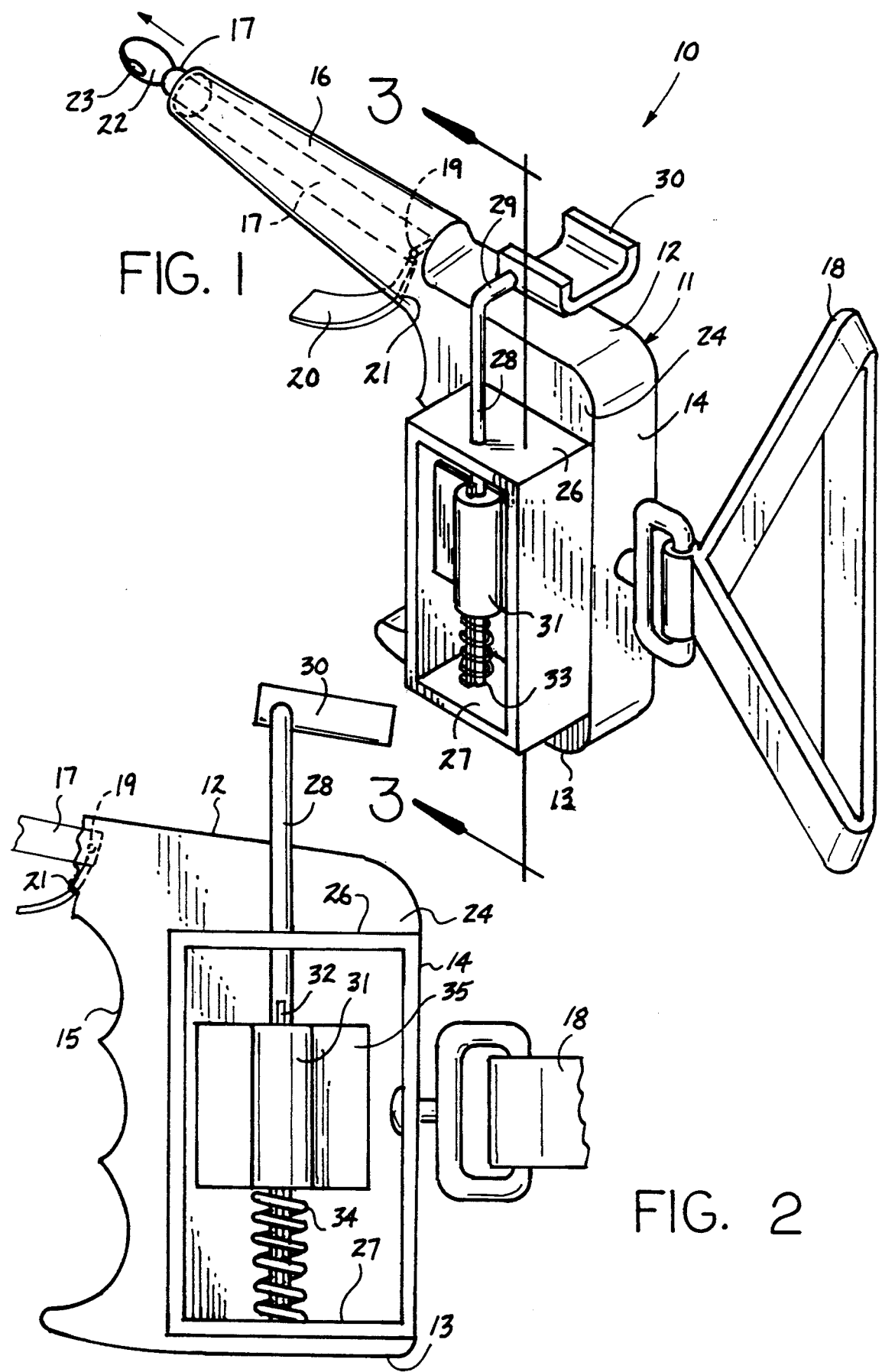

5,352,146

COMBINED TRIGGER BOW RELEASE AND TURKEY CALL

BACKGROUND OF THE INVENTION

1. Field of the Invention

The field of invention relates to turkey call apparatus, and more particularly pertains to a new and improved turkey call device wherein the same incorporates a turkey call structure in cooperation with a bow string release.

2. Description of the Prior Art

Turkey call structure of various types are utilized in the prior art and exemplified by the U.S. Pat. Nos. 4,041,639; 4,662,858; 5,066,260; and 4,836,822.

The instant invention attempts to overcome deficiencies of the prior art by incorporating a turkey call device in cooperation with a bow string release to permit simultaneous control of an auditory turkey call in cooperation with a bow string. In this manner, control of an associated archery bow is availed to an individual while sounding a turkey call to draw turkeys in and not discourage such turkeys by avoiding unnecessary noise and the like as the turkey call and bow string structure are mounted to a unitary housing.

SUMMARY OF THE INVENTION

In view of the foregoing disadvantages inherent in the known types of turkey call apparatus now present in the prior art, the present invention provides a turkey call device wherein the same is arranged to direct a rubbing or projecting finger along a striker plate in cooperation with a bow string release structure. As such, the general purpose of the present invention, which will be described subsequently in greater detail, is to provide a new and improved turkey call device which has all the advantages of the prior art turkey call apparatus and none of the disadvantages.

To attain this, the present invention provides a turkey call device arranged in cooperation with a bow string release to permit an individual to maintain control of an associated bow string while effecting actuation of a turkey call.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved turkey call device which has all the advantages of the prior art turkey call apparatus and none of the disadvantages.

It is another object of the present invention to provide a new and improved turkey call device which may be easily and efficiently manufactured and marketed.

It is a further object of the present invention to provide a new and improved turkey call device which is of a durable and reliable construction.

An even further object of the present invention is to provide a new and improved turkey call device which is susceptible of a low cost of manufacture with regard to both materials and labor, and which accordingly is then susceptible of low prices of sale to the consuming public, thereby making such turkey call devices economically available to the buying public.

Still yet another object of the present invention is to provide a new and improved turkey call device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the invention.

FIG. 2 is a partial orthographic side view of the invention.

DESCRIPTION OF THE PREFERRED EMBODIMENT

Figure 3:
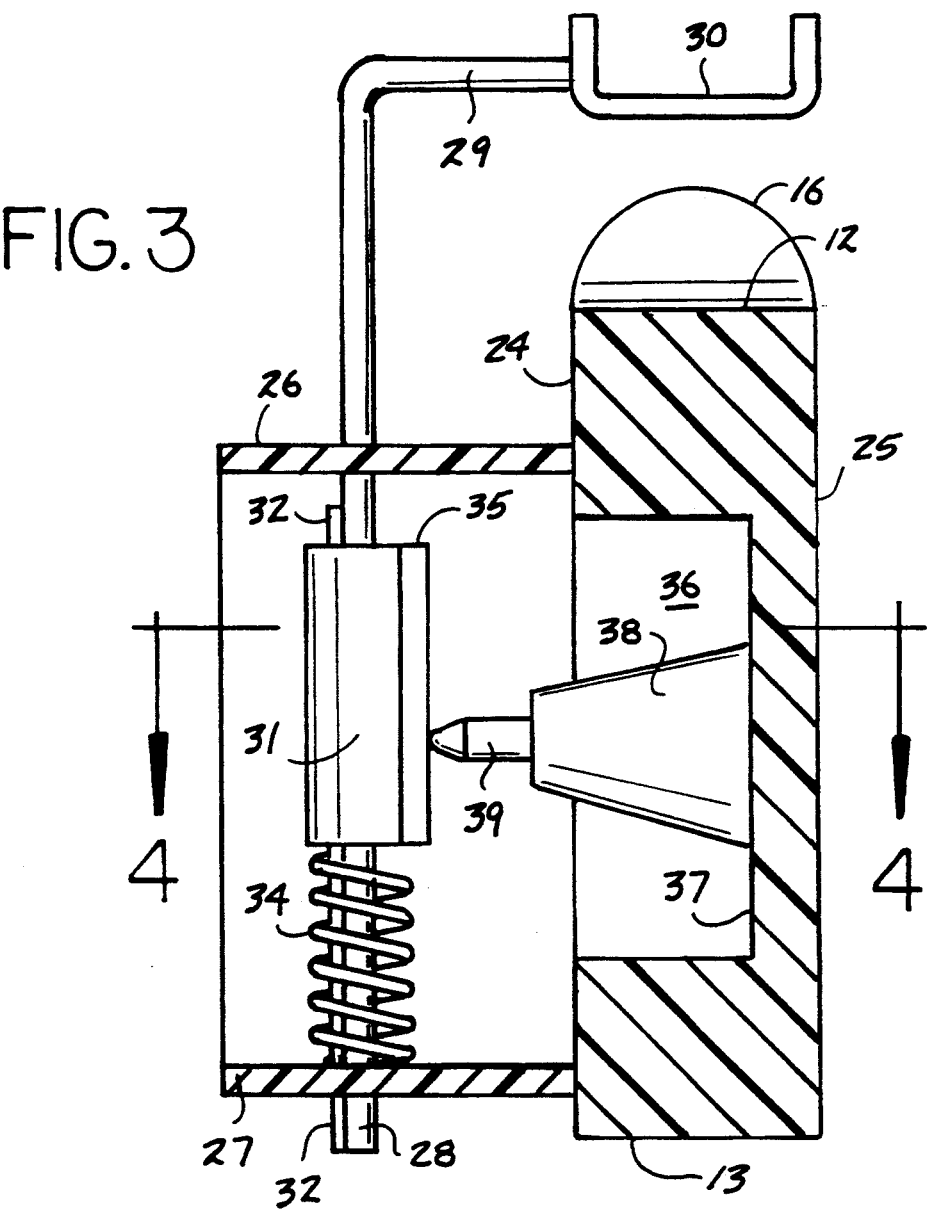
FIG. 3 is an orthographic view, taken along the lines 3—3 of FIG. 1 in the direction indicated by the arrows.
Figure 4:
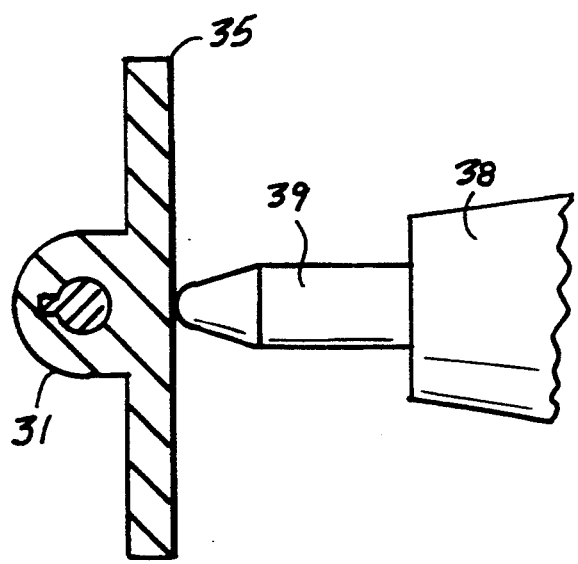
FIG. 4 is an orthographic view, taken along the lines 4—4 of FIG. 3 in the direction indicated by the arrows.

With reference now to the drawings, and in particular to FIGS. 1 to 8 thereof, a new and improved turkey call device embodying the principles and concepts of the present invention and generally designated by the reference numeral 10 will be described.

More specifically, the turkey call device 10 of the instant invention essentially comprises a housing 11 having a top wall 12 spaced from a bottom wall 13, a rear wall 14 spaced from a front wall 15, with a barrel tube 16 projecting from the housing front in adjacency to the top wall. A reciprocating barrel rod 17 is mounted within the barrel tube 16, such that the barrel rod 17 is formed with a bifurcated rod head 22 formed of resilient material to receive a bow string in a bow string receiving slot 23 and a user pushes the resilient rod head 22 within the barrel tube 16 manually, and the friction the compressed head within the barrel tube is sufficient to secure the head as a bow string is drawn backward under tension in this manner. When the resilient rod head 22 is projected within the barrel tube 16, the rod head 22 is compressed to secure a bow string within the receiving slot 23. Upon projection of the barrel rod 17 from the barrel tube by pivoting a trigger lever 20 about a trigger axle 21, a barrel rod axle 19 mounted to the trigger lever 20 at a junction of the trigger lever with the barrel rod projects the barrel rod 17 and the bifurcated rod head 22 specifically beyond the barrel tube 16 permitting release of a bow string contained within the bow string receiving slot 23.

The housing 11 is formed further with housing first and second side walls 24 and 25, such that a container is mounted to the first side wall 24, including container top and bottom walls 26 and 27 respectively arranged in a parallel relationship relative to one another. A reciprocating guide rod 28 is slidably and orthogonally directed through the container top and bottom walls 26 and 27, with the container bottom wall 27 including a bottom wall bore 33 of a generally keyhole shape configuration to receive the guide rod 28 as well as a key flange 32 integral with the guide rod 28 to maintain alignment of the guide rod directed through the bottom wall bore 33. A striker boss 31 is integrally mounted to the guide rod 28 between the top and bottom walls, with a striker boss spring 34 captured between the striker boss and the container bottom wall 27, with the striker boss spring 34 wound about the guide rod 28 and its associated key flange 32 between the striker boss 31 and the container bottom wall 27. A striker plate 35 is fixedly mounted to the striker boss 31, with the striker plate 35 arranged in a facing relationship relative the first side wall cavity 36 and more specifically, to a first side wall cavity floor 37, as illustrated in FIG. 3. A mounting hub 38 secured to the cavity floor 37 includes a projecting leg 39 typically formed of plexiglass to cooperate with the striker plate 35, formed typically of slate, to provide for a weather proof inter-engaging surface when the projecting leg 39 is arranged to rub the striker plate 35 when an individual applies downward manual pressure onto a U-shaped trough 30 mounted integrally to an extension leg 29 that extends obliquely relative to the guide rod 28, with the U-shaped trough 30 positioned over the housing top wall 12 for ease of manipulation of the organization. In this manner, and particularly with a wrist strap 18 arranged for positioning about an individual's wrist, the bow string release structure as well as the turkey call structure may be employed in a convenient, cooperative relationship.

Figure 5:
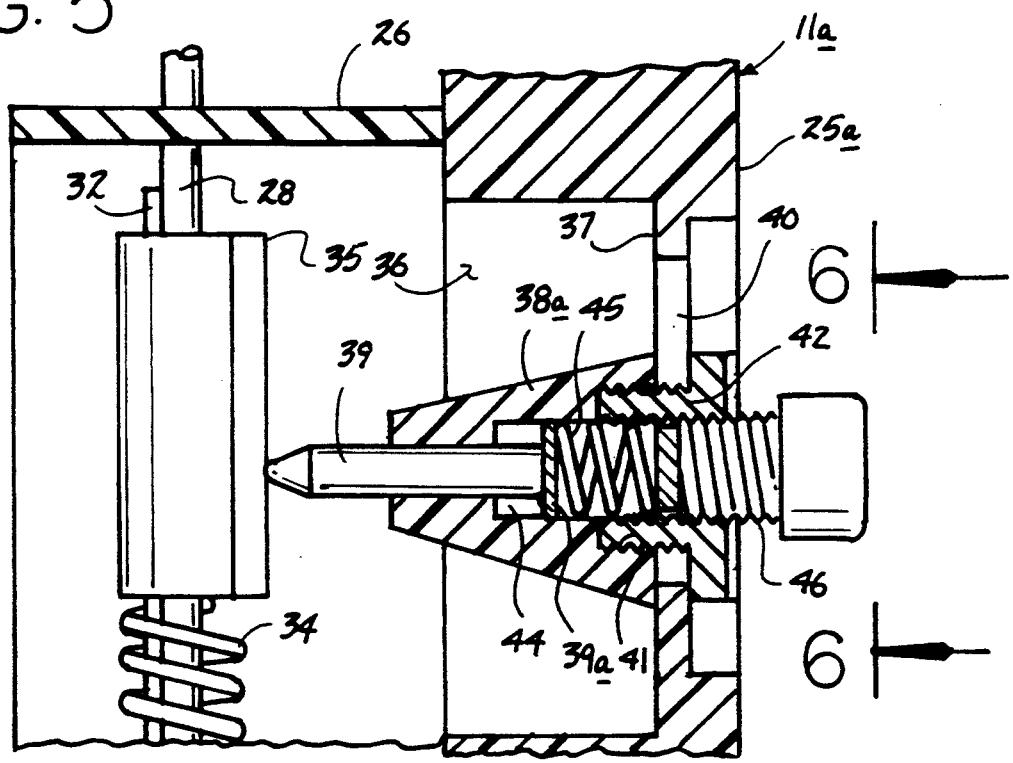
FIG. 5 is an orthographic cross-sectional illustration of a modified projecting finger in cooperation with the striker plate.
Figure 6:
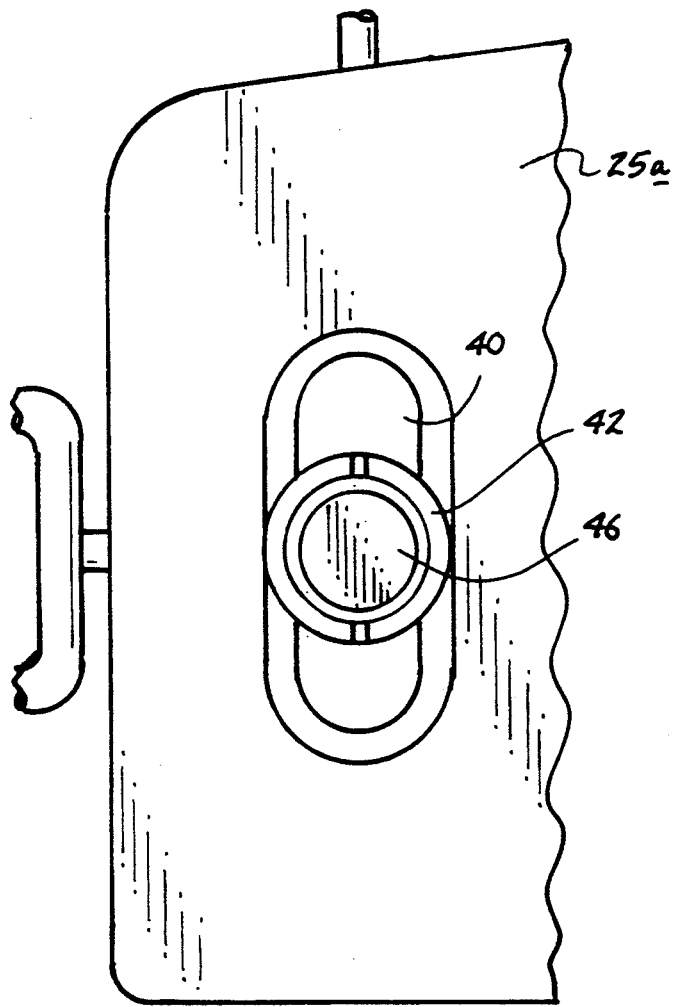
FIG. 6 is an orthographic view, taken along the lines 6—6 of FIG. 5 in the direction indicated by the arrows.
Figure 7:
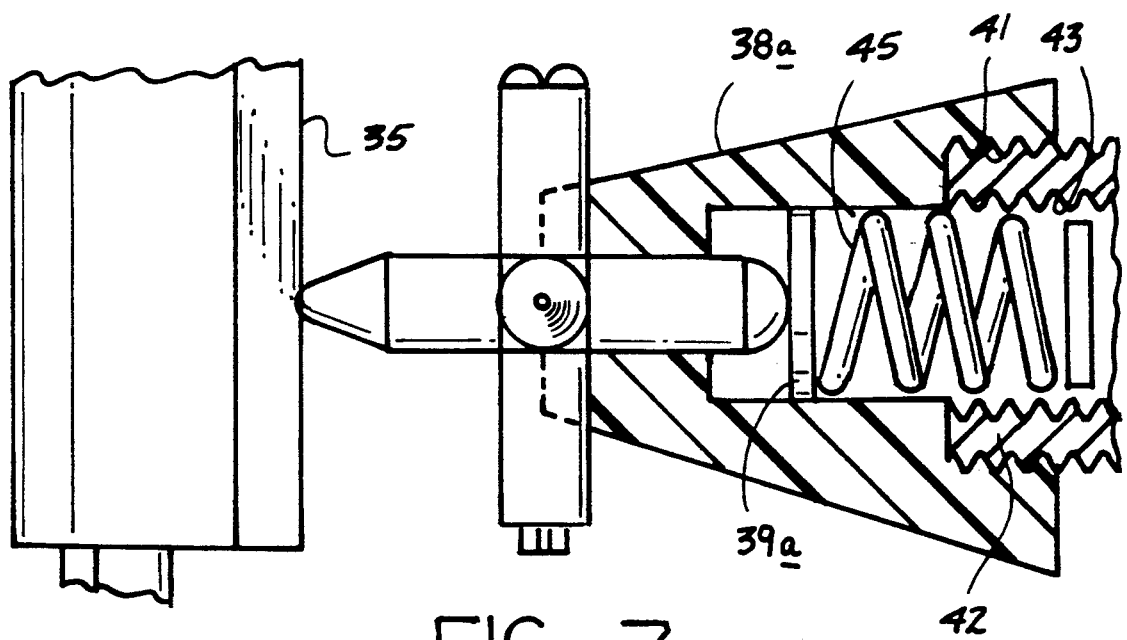
FIG. 7 is an orthographic view indicating a modified projecting finger structure.

The FIGS. 5 and 6 indicate the use of a modified housing 11a, such that a modified housing second side wall 25a mounts a modified mounting hub 38a within the cavity 36, and more specifically onto the slot 40 of the cavity floor 37. A modified mounting hub 38a includes a mounting hub bore 44 to slidably receive the projecting leg 39, such that a projecting leg support plate 39a is fixedly mounted to a spring member 45 received in interposed relationship between the support plate 39a and a screw member 46 threadedly directed into an internally threaded locking lug 42 that has external threading arranged to threadedly engage the mounting hub internally threaded bore 41 (see FIG. 7). As illustrated, the locking lug internally threaded bore 43 threadedly receives the screw member 46 to provide for selective pressure of the projecting leg 39 against the striker plate 35 to change audible signals.

Figure 8:
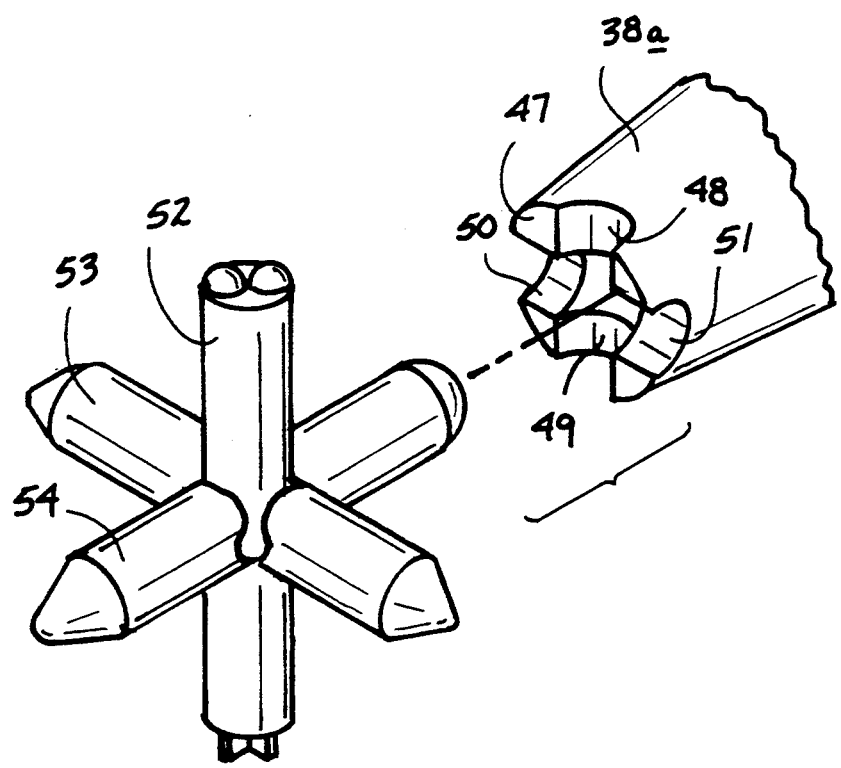
FIG. 8 is an isometric illustration of a modified projecting finger structure, as indicated in FIG. 7.

Further, to further enhance capacity of the structure to provide for various audible signals of various types that may be more effective dependent upon weather and climatic conditions, the modified mounting hub 38a is formed with first and second semi-cylindrical recesses 48 and 49 that are coaxially aligned and orthogonally oriented relative to third and fourth semicylindrical recesses 50 and 51 extending through the mounting hub tip 47. First, second, and third projecting legs 52, 53, and 54 orthogonally, fixedly, and medially intersect one another, with a plurality of the projecting legs arranged for reception within the first through fourth semi-cylindrical recesses 48-51, as illustrated in FIG. 8.

Further as illustrated in FIGS. 5 and 6, a second side wall slot directed through the second side wall 25a permits vertical alignment and adjustment of the projecting leg structure, as well as the modified mounting hub 38a along the second side wall to provide for the projecting leg to engage various portions of the striker plate 35 to thusly accommodate wear and erosion of the striker plate.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A turkey call device, comprising,
 a unitary housing, having a top wall spaced from a bottom wall, a rear wall spaced from a front wall, and a first side wall spaced from a second side wall,
 a barrel tube extending from the front wall in adjacency to the top wall,
 and a barrel rod reciprocatably mounted within the barrel tube, the barrel rod having a resilient bifurcated rod head arranged for selective compression when directed into the barrel tube, with the bifurcated rod head including a bow string receiving slot, and a trigger lever pivotally mounted to the housing, including a trigger axle pivotally mounting the trigger lever to the housing, with a barrel rod axle pivotally mounting the trigger lever to the barrel rod, whereupon pulling of the trigger lever to the front wall effects projection of the barrel rod from the barrel tube,
and
a container mounted to the first side wall, having a container top wall and a container bottom wall arranged in a parallel relationship and orthogonally mounted to the first side wall, with a guide rod reciprocatably directed through the container top wall and the container bottom wall, the guide rod having an extension leg extending over the housing top wall, with the extension leg including a trough member to accommodate an individual's finger thereon to direct the guide rod through the container top wall and container bottom wall,
and
a striker boss fixedly mounted to the guide rod, with the striker boss including a striker plate fixedly mounted to the striker boss,
and
a first side wall cavity directed into the first side wall, with the first side wall cavity having a cavity floor in facing relationship relative to the striker plate,
and
a mounting hub secured relative to the cavity floor, having projecting leg means extending from the mounting hub, wherein the projecting leg means is arranged to frictionally engage the striker plate for effecting an audible signal.

2. A turkey call device as set forth in claim 1 wherein the mounting hub includes a mounting hub bore, and a spring positioned within the mounting hub bore, the spring having a spring plate, the spring plate arranged to engage the projecting leg means and bias the projecting leg means in contiguous engagement with the striker plate.

3. A turkey call device as set forth in claim 2 including a slot directed through the second side wall in communication with the first side wall cavity, and an externally threaded locking lug threadedly received within the mounting hub, and the externally threaded lug including a locking lug internally threaded bore threadedly receiving a screw member, with the spring captured between the screw member and the spring plate.

4. A turkey call device as set forth in claim 3 wherein the projecting leg means includes a first projecting leg, a second projecting leg, and a third projecting leg, each orthogonally and medially intersecting one another in a fixed relationship relative to one another, with the mounting hub including a mounting hub tip and the mounting hub tip including a first and second semi-cylindrical recess coaxially aligned relative to one another, and a third and fourth semi-cylindrical recess coaxially aligned relative to one another, with the first and second semi-cylindrical recesses orthogonally oriented relative to the third and fourth semi-cylindrical recesses, with the first semi-cylindrical recess, the second semi-cylindrical recess, the third semi-cylindrical recess, and the fourth semi-cylindrical recess receiving the projecting leg means therewithin.

* * * * *